United States Patent
Sakaue et al.

(10) Patent No.: US 9,831,734 B2
(45) Date of Patent: Nov. 28, 2017

(54) ELECTRIC MACHINE

(71) Applicants: Atsushi Sakaue, Tokyo (JP); Hiroyuki Akita, Tokyo (JP); Hironori Tsuiki, Tokyo (JP); Masaya Inoue, Tokyo (JP)

(72) Inventors: Atsushi Sakaue, Tokyo (JP); Hiroyuki Akita, Tokyo (JP); Hironori Tsuiki, Tokyo (JP); Masaya Inoue, Tokyo (JP)

(73) Assignee: MITSUBISHI ELECTRIC CORPORATION, Chiyoda-Ku, Tokyo (JP)

( * ) Notice: Subject to any disclaimer, the term of this patent is extended or adjusted under 35 U.S.C. 154(b) by 214 days.

(21) Appl. No.: 14/427,713

(22) PCT Filed: Feb. 26, 2013

(86) PCT No.: PCT/JP2013/054900
§ 371 (c)(1),
(2) Date: Mar. 12, 2015

(87) PCT Pub. No.: WO2014/050164
PCT Pub. Date: Apr. 3, 2014

(65) Prior Publication Data
US 2015/0249372 A1  Sep. 3, 2015

(30) Foreign Application Priority Data
Sep. 26, 2012  (JP) .................. 2012-212669

(51) Int. Cl.
*H02K 3/34* (2006.01)
*H02K 3/32* (2006.01)
*H01B 7/02* (2006.01)

(52) U.S. Cl.
CPC .............. *H02K 3/345* (2013.01); *H02K 3/34* (2013.01); *H01B 7/02* (2013.01)

(58) Field of Classification Search
CPC .. H02K 3/12; H02K 3/32; H02K 3/34; H02K 3/345; H02K 3/04; H01B 7/02
(Continued)

(56) References Cited

U.S. PATENT DOCUMENTS

| 5,254,806 A * | 10/1993 | Gross ..................... H01B 7/292 |
| | | 156/201 |
| 6,373,163 B1 * | 4/2002 | Oohashi ................... H02K 3/12 |
| | | 310/184 |
| 2006/0137899 A1 * | 6/2006 | Schafer .................... H01B 3/30 |
| | | 174/128.1 |

FOREIGN PATENT DOCUMENTS

JP  58165645 A  *  9/1983
JP  59-144346 A     8/1984
(Continued)

OTHER PUBLICATIONS

English machine translation, Okochi et al. JP 2013-005481 Jan. 2013.*
(Continued)

*Primary Examiner* — Burton Mullins
(74) *Attorney, Agent, or Firm* — Buchanan Ingersoll & Rooney PC (57) ABSTRACT

In the electric machine according to the present invention, conductor wires are housed inside slots so as to be arranged into multiple layers in one column so as to contact each other in a slot depth direction in each column such that a longitudinal direction of a long side of an oblong cross section of a conductor portion faces in the slot depth direction, and a thickness of a portion of an insulating coating that is formed on a surface of the conductor portion that faces in the slot depth direction is thinner than a thickness of a portion of the insulating coating that is formed on a surface of the conductor portion that faces in a direction of slot arrangement.

14 Claims, 5 Drawing Sheets

(58) Field of Classification Search
USPC .......... 310/179, 184, 215; 174/119 R, 133 R
See application file for complete search history.

(56) References Cited

FOREIGN PATENT DOCUMENTS

| | | | | |
|---|---|---|---|---|
| JP | 6-189482 A | 7/1994 | | |
| JP | 2004-236441 A | 8/2004 | | |
| JP | 2008-259371 A | 10/2008 | | |
| JP | 2009-232607 A | 10/2009 | | |
| JP | 2011-072052 A | 4/2011 | | |
| JP | 2012-175822 A | 9/2012 | | |
| JP | 2013-5481 | * | 1/2013 | ............... H02K 3/04 |
| JP | 2015-107024 | * | 6/2015 | ............... H02K 3/04 |
| WO | WO 2012/114181 A1 | 8/2012 | | |

OTHER PUBLICATIONS

English machine translation, Kaneiwa et al., JP 2009-232607 Oct. 2009.*
Office Action dated Aug. 30, 2016, by the Chinese Patent Office in corresponding Chinese Patent Application No. 201380050173.8 and English translation of the Office Action. (10 pages).
International Search Report (PCT/ISA/210) dated May 21, 2013, by the Japanese Patent Office as the International Searching Authority for International Application No. PCT/JP2013/054900.
Written Opinion (PCT/ISA/237) dated May 21, 2013, by the Japanese Patent Office as the International Searching Authority for International Application No. PCT/JP2013/054900.

* cited by examiner

ELECTRIC MACHINE

TECHNICAL FIELD

The present invention relates to an electric machine such as a rotary electric machine such as a generator or an electric motor, or a direct acting machine such as a linear motor, and particularly relates to an armature winding construction that can achieve high insulation performance and high space factor.

BACKGROUND ART

In recent years, in rotary electric machines that are mounted to vehicles, there is demand for downsizing to accompany size reductions in mounting space for rotary electric machines in vehicle engine rooms, and for improvements in generated power output due to increases in vehicle load. There is also demand for improvements in reliability.

In consideration of such conditions, various proposals have been made in order to achieve compactness and high output, as well as improvements in quality. In the armature winding that is described in Patent Literature 1, for example, windings that are formed so as to have barrel-shaped cross sections are housed multiply in slots into which insulating sheets have been mounted. The windings are covered by insulating coatings, the insulating coatings on the circular arc-shaped surfaces of the barrel-shaped cross sections contact each other, and the insulating coatings on the side surfaces contact the armature core so as to have the insulating sheets interposed. The insulating coatings on the circular arc-shaped surfaces are formed so as to be thicker than the insulating coatings on the side surfaces.

CITATION LIST

Patent Literature

Patent Literature 1: Japanese Patent Laid-Open No. HEI 6-189482 (Gazette)

SUMMARY OF THE INVENTION

Problem to be Solved by the Invention

In Patent Literature 1, the armature winding is housed multiply in slots into which insulating sheets have been mounted such that the side surfaces of the barrel-shaped cross sections thereof face circumferentially. Thus, a separating distance between a conductor portion of the armature winding and a core back of an armature core is a sum of a thickness of the insulating coating on the side surfaces and a thickness of the insulating sheets. A separating distance between the conductor portion of the armature winding and the teeth of the armature core, on the other hand, is a sum of a thickness of the insulating coating on the circular arc-shaped surfaces and the thickness of the insulating sheets. However, because the thickness of the insulating coating on the circular arc-shaped surfaces is thicker than the insulating coating on the side surfaces, even if the separating distance between the conductor portion of the armature winding and the core back of the armature core can be set to a minimum distance that is required in order to ensure insulation performance (an insulating distance), the separating distance between the conductor portion of the armature winding and the teeth of the armature core does not reach the insulating distance. As a result, one problem has been that space factor is reduced, making increased output unachievable.

The present invention aims to solve the above problems and an object of the present invention is to provide an electric machine that can improve space factor and enable improvements in quality and increased output to be achieved while ensuring insulation performance, by enabling thickness of insulating coatings in a slot depth direction and thickness of insulating coatings in a direction of slot arrangement of conductor wires that are housed inside slots so as to line up in the slot depth direction and contact each other to be set independently, from insulating distance between conductor portions, and from insulating distance between conductor portions and an armature core, respectively.

Means for Solving the Problem

In order to achieve the above object, according to one aspect of the present invention, there is provided an electric machine including: an armature that includes: an armature core in which a plurality of slots are arranged in a slot width direction; and an armature winding that is configured by mounting conductor wires into the slots. The conductor wires include: a conductor portion that has an oblong cross section; and an insulating coating that is formed so as to cover an outer periphery of the conductor portion, the conductor wires being housed inside the slots so as to be arranged into multiple layers so as to line up in at least one column in a direction of slot arrangement so as to contact each other in a slot depth direction in each column such that a longitudinal direction of a long side or of a short side of the oblong cross section of the conductor portion faces in the slot depth direction, and the insulating coating is formed so as to satisfy an expression $t_1 < t_2$, where $t_1$ is a thickness of a portion of the insulating coating that is formed on a surface of the conductor portion that faces in the slot depth direction, and $t_2$ is a thickness of a portion of the insulating coating that is formed on a surface of the conductor portion that faces in the direction of slot arrangement.

Effects of the Invention

According to the present invention, a thickness $t_1$ of a portion of an insulating coating that is formed on a surface of a conductor portion that faces in a slot depth direction is thinner than a thickness $t_2$ of a portion of the insulating coating that is formed on a surface of the conductor portion that faces in the direction of slot arrangement. Thus, because $t_1$ and $t_2$ can be set independently, from the insulating distance between the conductor portions in the slot depth direction, and from the insulating distance between the conductor portions and the armature core, space factor can be improved while ensuring insulation performance.

DESCRIPTION OF EMBODIMENTS

Preferred embodiments of a rotary electric machine according to the present invention will now be explained with reference to the drawings.

Embodiment 1

Figure 1:
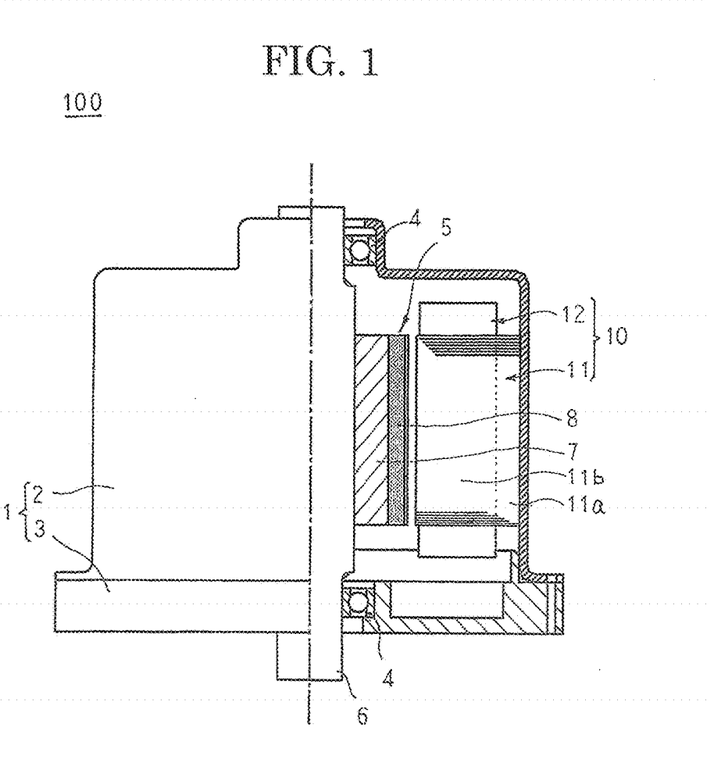
FIG. 1 is a half section that shows a rotary electric machine according to Embodiment 1 of the present invention.
Figure 2:
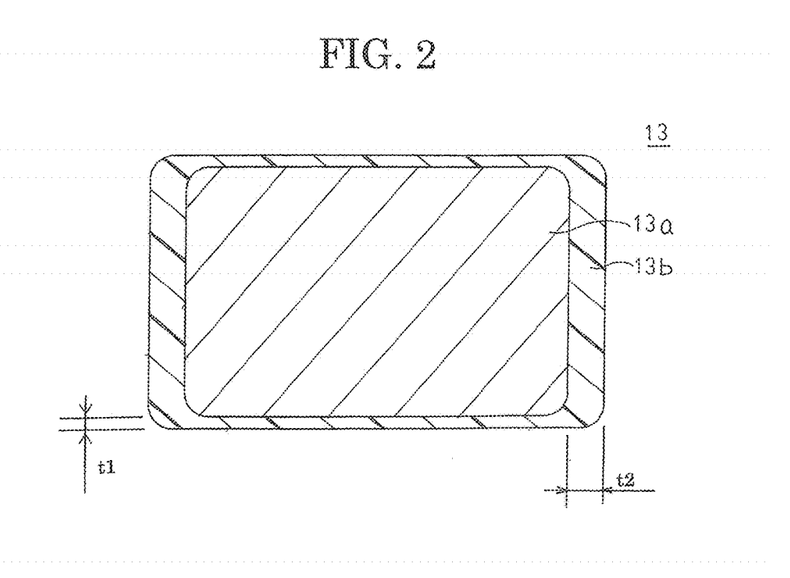
FIG. 2 is a cross section that shows an armature winding in the rotary electric machine according to Embodiment 1 of the present invention.
Figure 3:
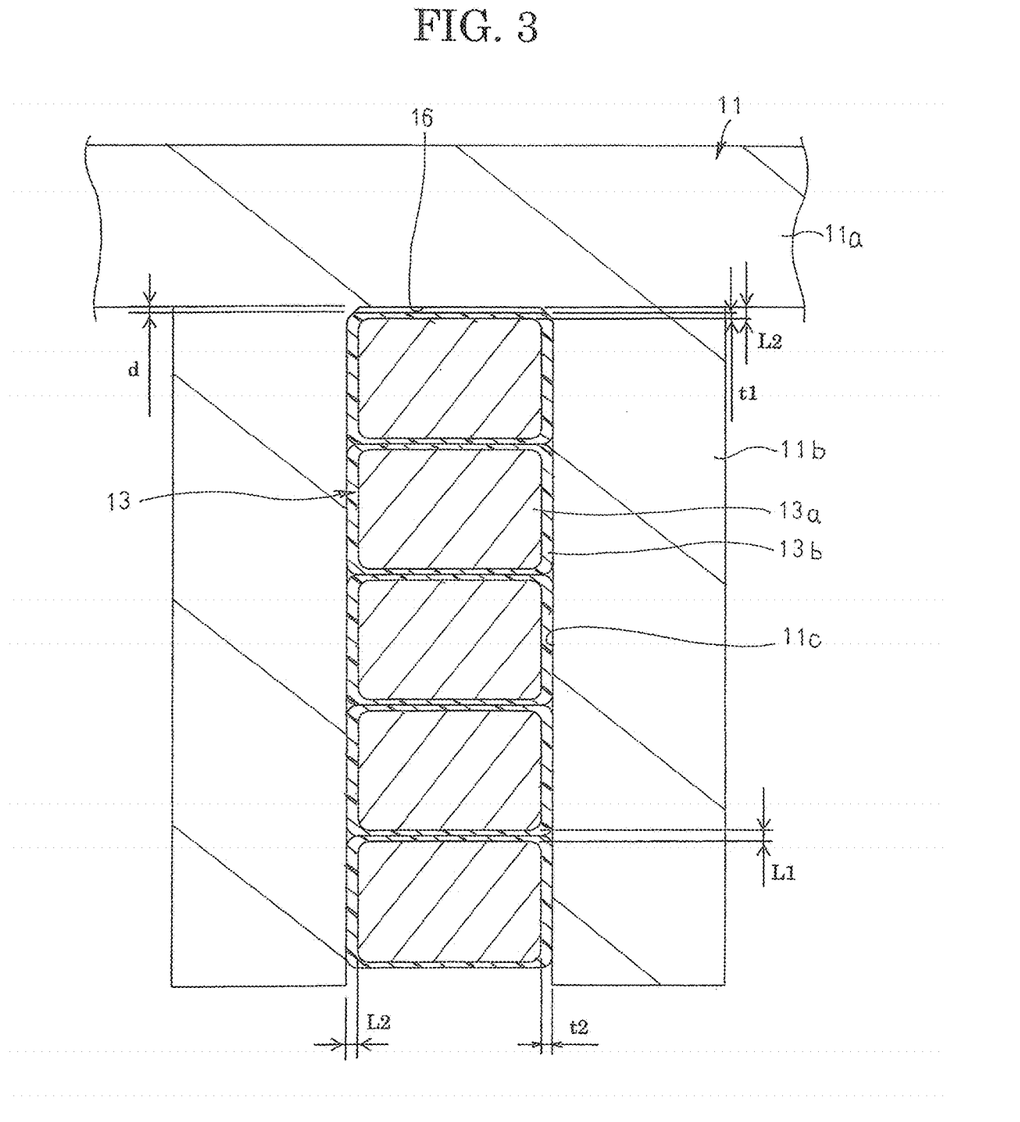
FIG. 3 is a cross section that explains a slot-housed state of the armature winding in the rotary electric machine according to Embodiment 1 of the present invention.

FIG. 1 is a half section that shows a rotary electric machine according to Embodiment 1 of the present invention, FIG. 2 is a cross section that shows an armature winding in the rotary electric machine according to Embodiment 1 of the present invention, and FIG. 3 is a cross section that explains a slot-housed state of the armature winding in the rotary electric machine according to Embodiment 1 of the present invention.

In FIG. 1, a rotary electric machine 100 includes: a housing 1 that has: a floored cylindrical frame 2; and an end plate 3 that closes an opening of the frame 2; an armature 10 that is fixed to a cylindrical portion of the frame 2 in an internally fitted state; and a rotor 5 that is fixed to a rotating shaft 6 that is rotatably supported in the floor portion of the frame 2 and the end plate 3 by means of bearings 4 so as to be rotatably disposed on an inner circumferential side of the armature 10.

The rotor 5 includes: a rotor core 7 that is fixed to the rotating shaft 6, which is inserted through a central axial position thereof; and permanent magnets 8 that are embedded so as to pass through axially near an outer circumferential surface of the rotor core 7 so as to be arranged at a predetermined pitch circumferentially. The permanent magnets 8 are respectively disposed such that different magnetic poles alternate circumferentially.

The armature 10 includes: an annular armature core 11 in which slots are arranged at a uniform angular pitch circumferentially so as to be open on an inner circumferential side; and an armature winding 12 that is mounted to the armature core 11. The armature core 11 is produced by stacking and integrating electromagnetic steel sheets that have been punched into predetermined shapes, for example, and has: an annular core back 11a; and teeth 11b that are respectively arranged so as to extend radially inward at a predetermined pitch in a circumferential direction from an inner circumferential surface of the core back 11a. Spaces that are bounded by the core back 11a and adjacent teeth 11b constitute slots 11c. Here, the circumferential direction of the armature core 11 corresponds to a slot width direction, i.e., a direction of arrangement of the slots 11c. The radial direction of the armature core 11 corresponds to a slot depth direction.

As shown in FIG. 2, a conductor wire 13 that constitutes the armature winding 12 has: a copper conductor portion 13a that has an oblong cross section; and an insulating coating 13b that is coated so as to cover an outer periphery of the conductor portion 13a. A thickness $t_1$ of a portion of the insulating coating 13b that is coated onto a flat surface that is constituted by a long side of the oblong cross section of the conductor portion 13a is thinner than a thickness $t_2$ of a portion of the insulating coating 13b that is coated onto a flat surface that is constituted by a short side of the oblong cross section of the conductor portion 13a. An insulating resin such as a polyamide, polypropylene, polytetrafluoroethylene, a polyamideimide, a polyester, a polyimide, or polyacetal, for example, can be used as the material of the insulating coating 13b. Moreover, the conductor wire 13 is produced by coating the insulating resin onto the outer periphery of a conductor wire that has a quadrangular cross section and baking it on, for example.

As shown in FIG. 3, the conductor wires 13 are housed inside the slots 11c in five layers so as to line up in a single column in a radial direction such that longitudinal directions of the short sides of the oblong cross sections are oriented radially. The flat surfaces that are constituted by the long sides of the oblong cross sections of the conductor portions 13a face in a radial direction. The portions of the insulating coatings 13b that are coated onto the flat surfaces that are constituted by the long sides of the oblong cross sections of the conductor portions 13a are designated radial surface insulating coatings. The flat surfaces that are constituted by the short sides of the oblong cross sections of the conductor portions 13a face in a circumferential direction. The portions of the insulating coatings 13b that are coated onto the flat surfaces that are constituted by the short sides of the oblong cross sections of the conductor portions 13a are designated circumferential surface insulating coatings. The conductor wires 13 are housed inside the slots 11c in five layers radially such that the radial surface insulating coatings, which have a thickness $t_1$, contact each other. The respective conductor wires 13 that are housed inside the slots 11c in five layers radially contact the inner peripheral side surfaces of the slots 11c so as to have the circumferential surface insulating coatings interposed, which have a thickness $t_2$. In addition, air gaps 16 are formed between the conductor wires 13 that are positioned in the deepest portions in the slot depth direction and bottom surfaces of the slots 11c.

Figure 4:
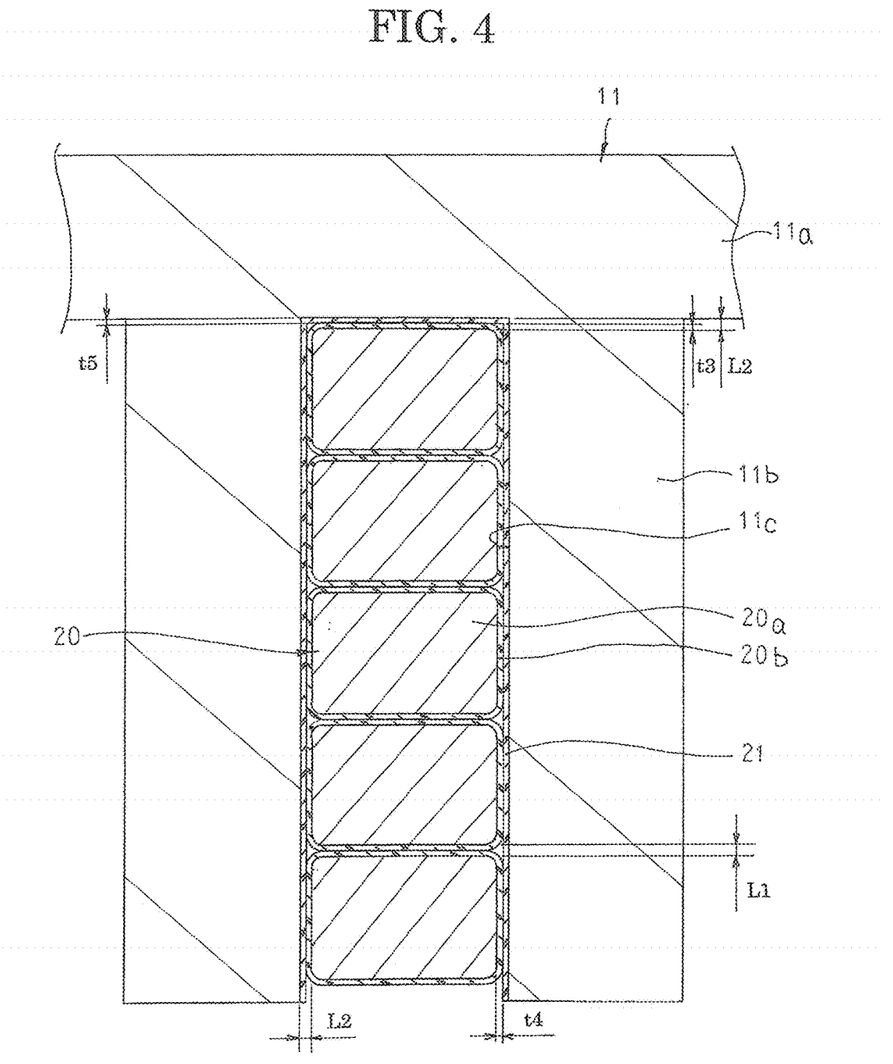
FIG. 4 is a cross section that explains a slot-housed state of an armature winding in a comparative rotary electric machine.

Next, the effects according to Embodiment 1 will be explained in contrast to a comparative example. FIG. 4 is a cross section that explains a slot-housed state of an armature winding in a comparative rotary electric machine.

As shown in FIG. 4, in the comparative example, a conductor wire 20 has: a copper conductor portion 20a that has an oblong cross section; and an insulating coating 20b that is coated so as to cover an outer periphery of the conductor portion 20a. A thickness $t_3$ of a portion of the insulating coating 20b that is coated onto a flat surface that is constituted by a long side of the oblong cross section of the conductor portion 20a is equal to a thickness $t_4$ of a portion of the insulating coating 20b that is coated onto a flat surface that is constituted by a short side of the oblong cross section of the conductor portion 20a. The conductor wires 20 are housed in five layers inside slots 11c to which insulating sheets 21 that have a thickness $t_5$ are mounted so as to line up in a single column in a radial direction such that longitudinal directions of the short sides of the oblong cross sections are oriented radially.

Here, the flat surfaces that are constituted by the long sides of the oblong cross sections of the conductor portions 20a face in a radial direction, and the flat surfaces that are constituted by the short sides of the oblong cross sections of the conductor portions 20a face in a circumferential direction. The portions of the insulating coatings 20b that are coated onto the flat surfaces that are constituted by the long sides of the oblong cross sections of the conductor portions 20a are designated radial surface insulating coatings, and the portions of the insulating coatings 20b that are coated onto the flat surfaces that are constituted by the short sides of the oblong cross sections of the conductor portions 20a are designated circumferential surface insulating coatings.

The conductor wires 20 are housed inside the slots 11c in five layers radially such that the radial surface insulating coatings, which have the thickness $t_3$, contact each other. The respective conductor wires 20 that are housed inside the slots 11c in five layers radially contact the inner peripheral side surfaces of the slots 11c (the teeth 11b) so as to have the insulating sheets 21 interposed. The conductor portions 20a that are positioned in the deepest portions of the slots 11c contact the bottom surfaces (the core backs 11a) of the slots 11c so as to have the insulating sheets 21 interposed.

In the comparative example, it is necessary to ensure an insulating distance $L_1$ (the smallest separating distance that is required in order to ensure insulation performance) between the conductor portions 20a. Thus, the thickness $t_3$ of the radial surface insulating coatings is set so as to satisfy an expression $t_3 \geq L_1/2$. It is also necessary to ensure an insulating distance $L_2$ between the conductor portions 20a and the armature core 11, i.e., between the conductor portions 20a and the teeth 11b. Thus, the thickness $t_4$ of the circumferential surface insulating coatings and the thickness $t_5$ of the insulating sheets 21 are set so as to satisfy an expression $t_4+t_5 \geq L_2$. Thus, the space factor is greatest when $t_3 = L_1/2$, and $t_4+t_5 = L_2$.

The separating distance between the conductor portions 20a that are positioned in the deepest portions of the slots 11c and the core back 11a is $(t_3+t_5)$. Because $t_3 = t_4$, $(t_3+t_5) = (t_4+t_5) = L_2$. Now, if the separating distance between the conductor portions 20a is the insulating distance $L_1$, then $t_3 = t_4 = L_1/2$, and the insulating distance $L_2$ between the conductor portions 20a and the armature core 11 cannot be ensured by the insulating coatings 20b alone. Thus, in the comparative example, it is necessary to interpose the insulating sheets 21 to ensure the insulating distance $L_2$.

In the comparative example, as in Patent Literature 1, if $t_3 > t_4$, then $(t_3+t_5) > (t_4+t_5) = L_2$. Thus, the separating distance between the conductor portions 20a and the core back 11a is longer than the insulating distance $L_2$ between the conductor portions 20a and the armature core 11, giving rise to reductions in space factor.

In Embodiment 1, it is also necessary to ensure the insulating distance $L_1$ between the conductor portions 13a. Thus, the thickness $t_1$ of the radial surface insulating coatings is set so as to satisfy an expression $t_1 \geq L_1/2$.

It is also necessary to ensure an insulating distance $L_2$ between the conductor portions 13a and the teeth 11b. Thus, the thickness $t_2$ of the circumferential surface insulating coatings is set so as to satisfy an expression $t_2 \geq L_2$.

In addition, it is necessary to ensure the insulating distance $L_2$ between the conductor portions 13a that are positioned in the deepest portions of the slots 11c and the core back 11a. Thus, the gap d of the air gaps 16 is set so as to satisfy an expression $d \geq L_2 - t_1$.

The separating distance between the conductor portions 13a and the core back 11a is $(t_1+d)$. Here, because $d \geq L_2 - t_1$, $t_1 + d \geq t_1 + L_2 - t_1 = L_2$. Thus, the insulating distance $L_2$ can be ensured between the conductor portions 13a and the core back 11a.

Because $t_2 > t_1$, the insulating distance $L_2$ can also be ensured between the conductor portions 13a and the teeth 11b if $t_2$ is set to the insulating distance $L_2$.

Thus, according to Embodiment 1, the thickness $t_1$ of the radial surface insulating coatings and the thickness $t_2$ of the circumferential surface insulating coatings can be set independently, from the insulating distance $L_1$ between the conductor portions 13a and from the insulating distance $L_2$ between the conductor portions 13a and the armature core 11. In other words, because the thickness $t_1$ of the radial surface insulating coatings and the thickness $t_2$ of the circumferential surface insulating coatings can be set so as to ensure the insulating distance $L_1$ and the insulating distance $L_2$, space factor can be increased while ensuring insulation performance. Thus, improvements in quality and increased output can be achieved in the rotary electric machine 100.

If $t_1 = t_2/2$, then the dielectric voltage between the conductor wires 13 and the dielectric voltage to ground (the dielectric voltage between the conductor wires and the armature core 11) become equal, enabling the space factor to be maximized.

By forming the gap d of the air gaps 16 to greater than or equal to $(t_2-t_1)$, the insulating distance $L_2$ between the conductor wires 13 and the core back 11a can be ensured without interposing insulating papers. Thus, because it is no longer necessary to mount the insulating sheets 21 into the slots 11c, the manufacturing steps for the armature 10 can be simplified.

Embodiment 2

Figure 5:
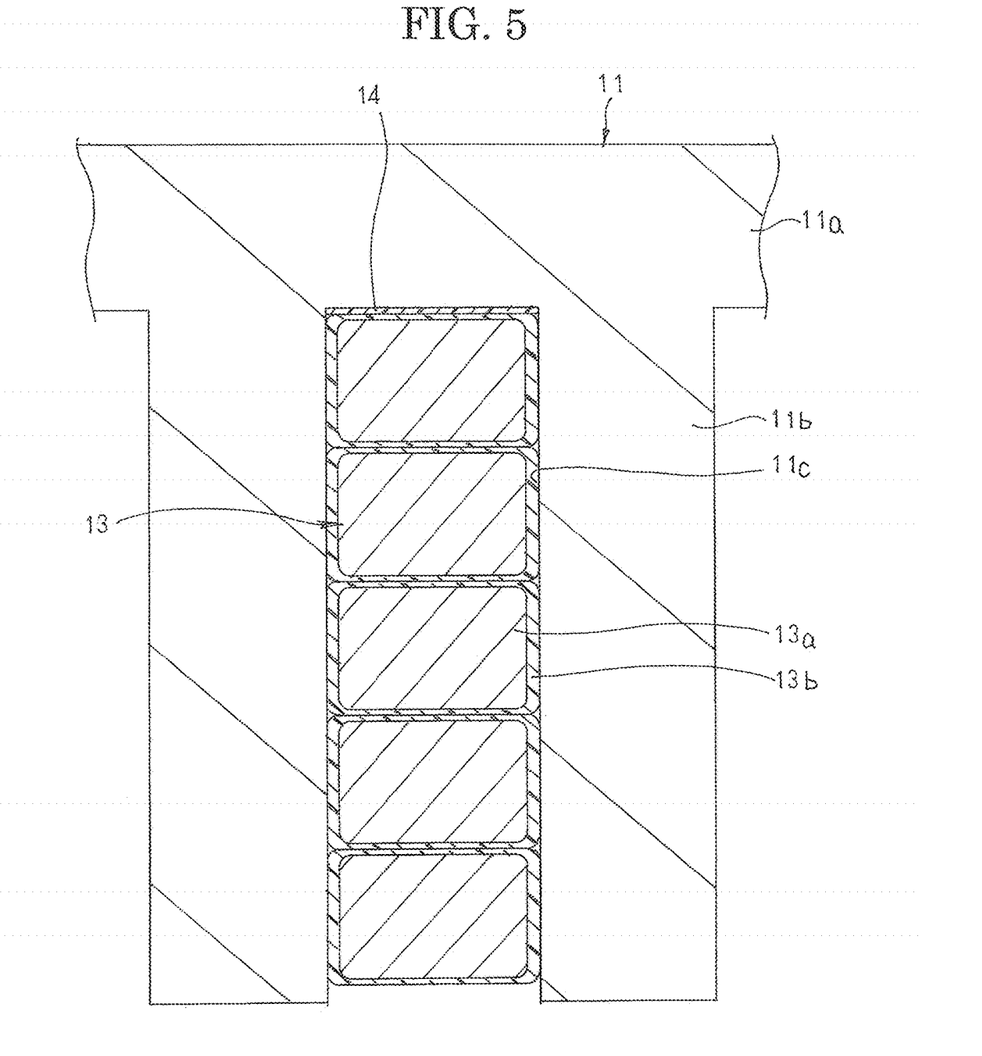
FIG. 5 is a cross section that explains a slot-housed state of an armature winding in a rotary electric machine according to Embodiment 2 of the present invention.

FIG. 5 is a cross section that explains a slot-housed state of an armature winding in a rotary electric machine according to Embodiment 2 of the present invention.

In FIG. 5, an insulating paper 14 is interposed only between a conductor portion 13a that is positioned in a deepest portion of a slot 11c and a core back 11a.

Moreover, the rest of the configuration is formed in a similar or identical manner to that of Embodiment 1 above.

In Embodiment 2, the insulating papers 14 are interposed between the conductor portions 13a that are positioned in the deepest portions of the slots 11c and the core back 11a. Thus, when the conductor wires 13 are housed inside the slots 11c so as to line up in a single column radially, the separating distance between the conductor portions 13a that are positioned in the deepest portions of the slots 11c and the core back 11a can be ensured with high precision. Consequently, by setting a thickness of the insulating papers 14 to $(t_2-t_1)$, the insulating distance $L_2$ can be ensured between the conductor portions 13a that are positioned in the deepest portions of the slots 11c and the core back 11a, enabling insulation performance to be ensured.

According to Embodiment 2, the insulating paper 14 can be interposed only between the conductor portions 13a that are positioned in the deepest portions of the slots 11c and the core back 11a, enabling use of the insulating paper 14 to be minimized, and the need for bending of the insulating paper 14 is also eliminated, improving productivity.

Embodiment 3

Figure 6:
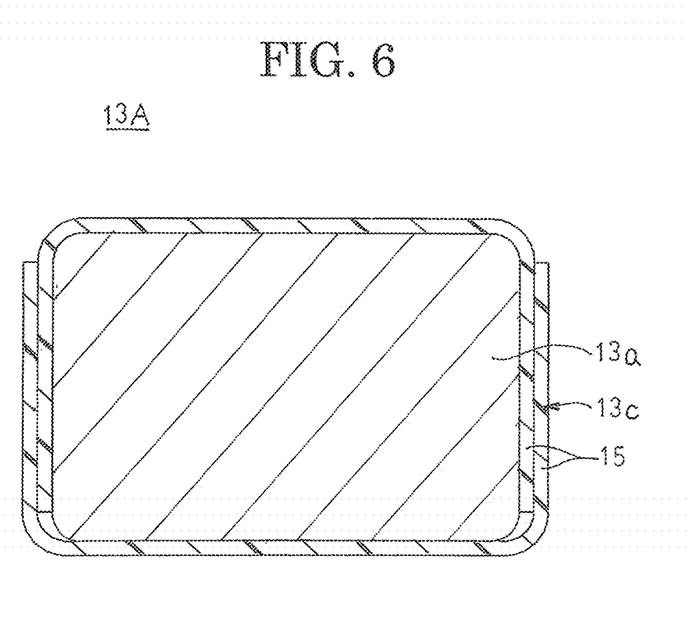
FIG. 6 is a cross section that shows a conductor wire that constitutes an armature winding in a rotary electric machine according to Embodiment 3 of the present invention.
Figure 7:
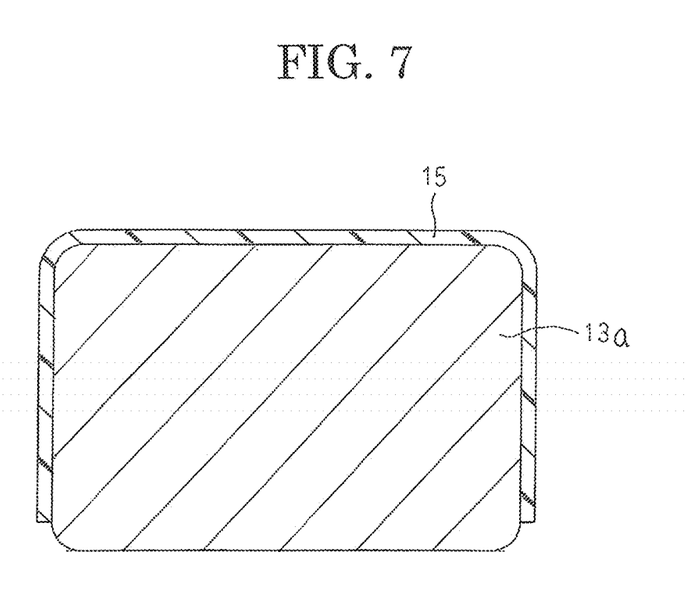
FIG. 7 is a cross section that explains a method for manufacturing the conductor wire that constitutes the armature winding in the rotary electric machine according to Embodiment 3 of the present invention.

FIG. 6 is a cross section that shows a conductor wire that constitutes an armature winding in a rotary electric machine according to Embodiment 3 of the present invention, and FIG. 7 is a cross section that explains a method for manufacturing the conductor wire that constitutes the armature winding in the rotary electric machine according to Embodiment 3 of the present invention.

In FIG. 6, the conductor wire 13A includes: a conductor portion 13a; and an insulating coating 13c that is coated onto an outer periphery of the conductor portion 13a.

Moreover, the rest of the configuration is formed in a similar or identical manner to that of Embodiment 1 above.

To produce the conductor wire 13A, a long oblong insulating tape 15 is first affixed to flat surfaces that are constituted by a first long side and two short sides of an oblong cross section of a conductor portion 13a that is produced using a metal material such as copper, etc. As shown in FIG. 7, three flat surfaces of the conductor portion 13a are thereby covered by the insulating tape 15. Next, the insulating tape 15 is affixed to flat surfaces that are constituted by a second long side and the two short sides of the oblong cross section of the conductor portion 13a. Thus, as shown in FIG. 6, a conductor wire 13A is produced in which the insulating tape 15 is affixed to the flat surfaces that are constituted by the long sides of the oblong cross section singly, and is affixed to the flat surfaces that are constituted by the short sides of the oblong cross sections doubly.

According to Embodiment 3, because the insulating coating 13c is produced by affixing the insulating tape 15 to the conductor portion 13a, the thickness of the insulating coating 13c that is formed on the flat surfaces that are constituted by the long sides of the oblong cross section of the conductor portion 13a, and the thickness of the insulating coating 13c that is formed on the flat surfaces that are constituted by the short sides, can be formed easily and with high precision, enabling productivity of the conductor wire 13A to be improved.

Moreover, in each of the above embodiments, the conductor wires are housed inside the slots so as to line up in a single column in a radial direction such that the longitudinal directions of the short sides of the oblong cross sections thereof face in the radial direction, but the conductor wires may be housed inside the slots so as to line up in a single column in the radial direction such that the longitudinal directions of the long sides of the oblong cross sections thereof face in the radial direction. In that case, thicknesses of portions of the insulating coatings that are formed on the flat surfaces that are constituted by the long sides of the oblong cross sections of the conductor wires (circumferential surface insulating coatings) should be made thicker than thicknesses of portions of the insulating coatings that are formed on the flat surfaces that are constituted by the short sides of the oblong cross sections of the conductor wires (radial surface insulating coatings).

In each of the above embodiments, the conductor wires are housed inside the slots in multiple layers so as to line up in a single column in a radial direction, but the conductor wires may be housed inside the slots so as to be respectively arranged into a plurality of columns in a circumferential direction so as to line up in multiple layers in single columns in the radial direction.

In each of the above embodiments, a rotary electric machine that is used in an electric motor or a generator has been explained, but similar or identical effects are also exhibited if the present invention is applied to a direct acting machine such as a linear motor.

The invention claimed is:

1. An electric machine comprising:
an armature that includes:
an armature core in which a plurality of slots are arranged in a slot width direction; and
an armature winding that is configured by mounting conductor wires that have similar cross sectional shapes into said slots,
wherein:
each conductor wire comprises:
a conductor portion that has an oblong cross section; and
an insulating coating that is formed so as to cover an outer periphery of said conductor portion,
said conductor wires being housed inside said slots so as to be arranged into multiple layers so as to line up in a single column in a slot depth direction so as to contact each other in said slot depth direction; and
said insulating coating is formed so as to satisfy an expression $t_1 < t_2$, where $t_1$ is a thickness of a portion of said insulating coating that is formed on an entire length of opposing surfaces of said conductor portion that face in said slot depth direction, and $t_2$ is a thickness of a portion of said insulating coating that is formed on a surface of said conductor portion that faces in said direction of slot arrangement.

2. The electric machine according to claim 1, wherein an insulating paper is interposed only between a conductor wire in a deepest position in said slot depth direction and a bottom surface of said slots.

3. The electric machine according to claim 1, wherein an air gap is formed between a conductor wire in a deepest position in said slot depth direction and a bottom surface of said slots, said air gap including a gap that is greater than or equal to $(t_2 - t_1)$.

4. The electric machine according to claim 1, wherein the insulating coating directly contacts a surface of the armature core.

5. The electric machine according to claim 1, wherein an insulating distance between the conductor portion in a deepest position in said slot depth direction and a bottom surface of said slots is $L_2$; and a distance between the insulating coating in a deepest position in said slot depth direction and the bottom surface of said slots is d, wherein $$L_2 - d \leq t_1, \text{ and } L_2 \leq t_2.$$

6. An electric machine comprising:
an armature that includes:
an armature core in which a plurality of slots are arranged in a slot width direction; and
an armature winding that is configured by mounting conductor wires that have similar cross sectional shapes into said slots,
wherein:
said conductor wires comprise:
a conductor portion that has an oblong cross section; and
an insulating coating that is formed so as to cover an outer periphery of said conductor portion,
said conductor wires being housed inside said slots so as to be arranged into multiple layers so as to line up in a single column in a slot depth direction so as to contact each other in said slot depth direction; and
said insulating coating is formed so as to satisfy an expression $t_1 < t_2$, where $t_1$ is a thickness of a portion of said insulating coating that is formed on a surface of said conductor portion that faces in said slot depth direction, and $t_2$ is a thickness of a portion of said insulating coating that is formed on a surface of said conductor portion that faces in said direction of slot arrangement, wherein an air gap is formed between a conductor wire in a deepest position in said slot depth direction and a bottom surface of said slots, wherein the air gap is provided along an entire length of the insulating coating extending from one surface of the conductor portion that faces in the direction of slot arrangement to an opposing surface of the conductor portion that faces in the direction of slot arrangement, said air gap including a gap that is greater than or equal to $(t_2-t_1)$.

7. The electric machine according to claim 1, wherein $t_1=t_2/2$.

8. The electric machine according to claim 7, wherein an insulating paper is interposed only between a conductor wire in a deepest position in said slot depth direction and a bottom surface of said slots.

9. The electric machine according to claim 7, wherein an air gap is formed between a conductor wire in a deepest position in said slot depth direction and a bottom surface of said slots, said air gap including a gap that is greater than or equal to $(t_2-t_1)$.

10. The electric machine according to claim 6, wherein $t_1=t_2/2$.

11. The electric machine according to claim 6, wherein an insulating distance between the conductor portion in a deepest position in said slot depth direction and a bottom surface of said slots is $L_2$; and a distance between the insulating coating in a deepest position in said slot depth direction and the bottom surface of said slots is d, wherein $$L_2-d \leq t_1, \text{ and } L_2 \leq t_2.$$

12. An electric machine comprising:
an armature that includes:
   an armature core in which a plurality of slots are arranged in a slot width direction; and
   an armature winding that is configured by mounting conductor wires that have similar cross sectional shapes into said slots,
wherein:
said conductor wires comprise:
a conductor portion that has an oblong cross section; and
an insulating coating that is formed so as to cover an outer periphery of said conductor portion,
said conductor wires being housed inside said slots so as to be arranged into multiple layers so as to line up in a single column in a slot depth direction so as to contact each other in said slot depth direction; and
said insulating coating is formed so as to satisfy an expression $t_1<t_2$, where $t_1$ is a thickness of a portion of said insulating coating that is formed on an entire length of a surface of said conductor portion that faces in said slot depth direction, and $t_2$ is a thickness of a portion of said insulating coating that is formed on a surface of said conductor portion that faces in said direction of slot arrangement,
wherein $t_1=t_2/2$.

13. The electric machine according to claim 12, wherein an insulating paper is interposed only between a conductor wire in a deepest position in said slot depth direction and a bottom surface of said slots.

14. The electric machine according to claim 12, wherein an insulating distance between the conductor portion in a deepest position in said slot depth direction and a bottom surface of said slots is $L_2$; and a distance between the insulating coating in a deepest position in said slot depth direction and the bottom surface of said slots is d, wherein $$L_2-d \leq t_1, \text{ and } L_2 \leq t_2.$$

* * * * *